United States Patent [19]

Aitken

[11] Patent Number: 4,784,977

[45] Date of Patent: Nov. 15, 1988

[54] HYDROGEN-CONTAINING GAS-CERAMICS

[75] Inventor: Bruce G. Aitken, Painted Post, N.Y.

[73] Assignee: Corning Glass Works, Corning, N.Y.

[21] Appl. No.: 167,181

[22] Filed: Mar. 11, 1988

[51] Int. Cl.$^4$ ............... C03C 10/02; C03C 3/097; C03C 3/064; C03C 11/00

[52] U.S. Cl. ........................... 501/10; 501/39; 501/63; 501/77; 65/33

[58] Field of Search ............ 501/10, 39, 63, 77; 65/33

[56] References Cited

U.S. PATENT DOCUMENTS 4,576,920  3/1986  MacDowell ..................... 501/10
4,666,867  5/1987  Beall et al. ..................... 501/10

Primary Examiner—Mark L. Bell
Attorney, Agent, or Firm—Clinton S. Janes, Jr.

[57] ABSTRACT

This invention is directed to the production of self-glazing gas-ceramic articles consisting essentially of very fine-grained cubic $BPO_4$ crystals and very small gas-containing bubbles uniformly distributed with a $SiO_2$-rich residual glassy matrix, the gas within the bubbles consisting predominantly of hydrogen. The inventive articles prepared in three basic steps:

(1) melting a batch for a glass consisting essentially, expressed in terms of weight percent on the oxide basis, of 30–60% $SiO_2$, 10–40% $B_2O_3$, 15–45% $P_2O_5$, and up to 20% total of at least one compound in the indicated proportion selected from the group consisting of 5–15% BN, 5–10% Si, 5–10% SiC, and 10–20% $Si_3N_4$;

(2) cooling the melt and shaping a glass body therefrom; and (3) heating the glass body between about 900°–1050° C.

3 Claims, No Drawings

HYDROGEN-CONTAINING GAS-CERAMICS

BACKGROUND OF THE INVENTION

U.S. Pat. No. 4,666,867 disclosed the preparation of glass microfoams and gas-ceramics (foamed glass-ceramic bodies) wherein the foams consisted of minute hydrogen-containing cells, those cells being produced through the inclusion in the starting batch of a hydrogen-generating agent selected from the group consisting of ammonia or ammonium salts and/or a combination of amines and/or carbohydrates and/or hydrocarbons with phosphates. Three distinct composition areas suitable for the production of the disclosed gas-ceramics were provided, viz.:

(a) compositions within the system $SiO_2$-$Al_2O_3$-$B_2O_3$-RO-$R_2O$ consisting essentially, expressed in terms of weight percent on the oxide basis, of:

| $SiO_2$ | 25-65 | RO | 0-15 |
|---|---|---|---|
| $Al_2O_3$ | 15-35 | $R_2O$ | 0-20 |
| $B_2O_3$ | 12-35 | RO + $R_2O$ | 0.15-20 |
| $P_2O_5$ | 0-10 | | | wherein RO is selected from the group consisting of MgO, CaO, SrO, BaO, and ZnO, and $R_2O$ is selected from the group consisting of alkali metal oxides;

(b) compositions within the $SiO_2$-$Al_2O_3$ ($B_2O_3$)-$P_2O_5$-$Li_2O$-[$ZrO_2$($TiO_2$)] system consisting essentially, expressed in terms of weight percent on the oxide basis, of

| $SiO_2$ | 40-50 | $ZrO_2$ | 0-10 |
|---|---|---|---|
| $Al_2O_3$ | 15-35 | $B_2O_3$ | 0-15 |
| $P_2O_5$ | 10-25 | $TiO_2$ | 0-5; and |
| $Li_2O$ | 1-7 | | |

(c) compositions within the $SiO_2$-$B_2O_3$-$P_2O_5$-[RO] system consisting essentially, expressed in terms of weight percent on the oxide basis, of:

| $SiO_2$ | 10-65 | $B_2O_3$ | 5-25 | $P_2O_5$ | 15-60 |
|---|---|---|---|---|---| which may optionally contain 0.5-10% MgO+CaO+ZnO consisting of 0-5% MgO, 0-5% CaO, and 0-10% ZnO.

It was observed that the gas-ceramics prepared from the above (a) and (c) group compositions exhibited an integral, dense glassy skin which not only imparted a pleasing aesthetic appearance to the foamed articles, but also enhanced the mechanical strength thereof and allowed the articles to be easily cleaned, since it barred the penetration of foreign particles into the articles. Where desired, it enabled the articles to be still further strengthened through thermal tempering.

It was also observed that the compositions of the above (c) group yielded the most uniform foams with bubbles (cells) of the smallest dimensions. Hence, cell diameters ranged between about 1-100 microns, with the preferred products having cells with diameters varying between about 5-20 microns. The article densities averaged about 1 g/cm³. The inclusion of the MgO, CaO, and/or ZnO in the base $SiO_2$-$B_2O_3$-$P_2O_5$ system was posited to inhibit restriction of cell expansion resulting from the crystallization in situ of $BPO_4$, thereby enabling the generation of a very minute, uniform cell size and the development of a smooth, glassy, monolithic skin on the foam bodies.

As can be appreciated, the use of a hydrogen-containing compound in the original glass forming batch (ammonium acid phosphate is stated to be the preferred batch ingredient) raises problems and creates hazards during the melting operation. Accordingly, the primary objective of the present invention was to prepare gas-ceramic articles having a microstructure of the type described in U.S. Pat. No. 4,666,867, but which would not require the inclusion of a hydrogen-containing batch ingredient. A further objective was to expand the list of ingredients which, when added to the aforementioned oxide batches, would produce similar gas-ceramic articles.

SUMMARY OF THE INVENTION

I have found those objectives can be achieved in a limited area of glass forming compositions within the $SiO_2$-$B_2O_3$-$P_2O_5$ base system, but which include an effective amount of a reducing agent selected from the group consisting of BN, $Si_3N_4$, silicon metal (Si), SiC, and mixtures thereof. Hence, a reduced glass within a very restricted region of the $SiO_2$-$B_2O_3$-$P_2O_5$ composition system, and absent a hydrogen-containing batch ingredient, can be prepared which, upon being heat treated, will produce a self-glazing gas-ceramic body. Such base glass compositions consist essentially, expressed in terms of mole percent on the oxide basis, of 40-75% $SiO_2$, 10-40% $B_2O_3$, and 10-35% $P_2O_5$ with up to 35% total of at least one reducing agent in the indicated proportion selected from the group consisting of 10-35% BN, 5-10% Si, 5-10% SiC, and 10-20% $Si_3N_4$. As expressed in terms of weight percent on the oxide basis, the base glass compositions consist essentially of 30-60% $SiO_2$, 10-40% $B_2O_3$, and 15-45% $P_2O_5$ with up to 20% total of at least one reducing agent in the indicated proportion selected from the group consisting of 5-15% BN, 5-10% Si, 5-10% SiC, and 10-20% $Si_3N_4$. Despite the large amount of reducing agent, glasses prepared from the above compositions are remarkable for being colorless and transparent.

Where desired to alter the chemical and/or physical properties of articles prepared from the base compositions alone, various compatible metal oxides in amounts not exceeding about 10% by weight total may be incorporated. Such oxides include the alkaline earth metal oxides, the alkali metal oxides, and most non-reducible transition metal oxides including ZnO, $Al_2O_3$, $Y_2O_3$, and the rare earth metal oxides. Small, but significant, modifications in the chemical and/or physical properties exhibited by the precursor glasses and the resultant gas-ceramics can be obtained through the addition of very small quantities, for example, as little as 0.5% by weight, of various oxides. Such additions will be compatible with the subsequent development of gas-ceramic articles for most stable metal oxides, with the exception of the readily reducible oxides of Mn, Fe, Co, Ni, W, Ag, and Sb.

The reduced glasses can be crystallized in situ by heat treating at temperatures in the range of about 900°-1050° C. More uniform crystallization and gas bubbles will be achieved through an initial nucleation of crystals in the temperature interval of about 700°-900° C. During the crystallization heat treatment, very fine-grained cubic boron phosphate ($BPO_4$) crystals having a β-cristobalite-type structure appear to form first, followed by the development of very small bubbles of gas. The final inventive product consists essentially of three phases; viz., crystals of $BPO_4$ having diameters smaller than about 0.5–1 micron and gas-containing pores having diameters between about 1–10 microns uniformly distributed in a $SiO_2$-rich residual glassy matrix. The crystals comprise at least 20% by volume (customarily <50% by volume) of the solid products, whereas the gas-filled pores constitute at least 45–65% of the total volume. Mass spectrometric analysis of the gas trapped in the cells indicated the presence of hydrogen as the predominant component. Nitrogen was also detected to a limited extent, but, owing to the concomitant detection of the appropriate concentration of argon, the occasional presence of this gas can be ascribed to air contamination during the analyses. The $SiO_2$-rich glass also comprises the surface skin that both enhances the aesthetic appearance of the inventive products and renders them very resistant to chemical attack.

The existence of hydrogen in the cells is believed to be the result of the reduction of stable $OH^-$ ions in the glass network, that reduction being brought about through reaction with a reduced phosphorus species, such as $P^{+3}$ or elemental P, present in the glass. The latter species has been detected in coarse gas bubbles observed in these glasses, and is also thought to be responsible for the typical orange-brown to bluish-black coloration developed by these reduced glasses when heated to temperatures between about 600°–800° C. Similar colors appearing in reduced phosphate glasses having compositions outside of those required for the inventive gas-ceramics have been attributed to the formation of colloidal dispersions of elemental phosphorus. Because of the absence of any nominal hydrogen-bearing constituents in the original glass batch ingredients, it has been posited that the $OH^-$ ions are introduced into the glass either as adsorbed water on the batch materials, or through the reaction of the melt with the humidity in the atmosphere. The basis for this hypothesis rests in the general recognition that phosphate melts are capable of dissolving considerable quantities of water.

In general terms, the inventive gas-ceramics are produced via a three-step process:

(1) a glass-forming batch of a desired composition is melted;

(2) the melt is cooled to a temperature at least within and, preferably, below the transformation range thereof and a glass body of a desired configuration simultaneously shaped therefrom; and (3) the glass body is heat treated at about 900°–1050° C. for a time sufficient to cause the development in situ of crystals and gas bubbles.

As explained above, smaller and more uniformly-sized crystals and gas-containing cells can be produced when Step 3 is undertaken in two stages; viz., an initial nucleation, typically about 1–3 hours, within the temperature interval of about 700°–900° C., followed by exposure to 900°–1050° C., for commonly about 1–4 hours.

(The transformation range is generally defined as that temperature at which a melt becomes an amorphous solid; that temperature customarily being deemed to reside in the vicinity of the annealing point of a glass.)

The linear coefficients of thermal expansion exhibited by the inventive materials vary between about $40-48 \times 10^{-7}/°C$. over the temperature interval of room temperature (R.T.) to 300° C. Dielectric constants have been measured at room temperature and 100 KHz from about 2.5–4, the values varying linearly with the density of the bodies. The dissipation factors are also low, ranging between about 0.001–0.007 at room temperature and 100 KHz, and between about 0.005–0.04 at room temperature and 100 Hz. Densities as low as 0.85 $g/cm^3$ have been measured, with typical values averaging about 1 $g/cm^3$. Weight losses as low as 0.1 $mg/cm^2$ and 0.01 $mg/cm^2$ have been determined after immersion for 24 hours at 95° C. in a 5% aqueous solution of HCl and in deionized water, respectively. Weight losses as low as 0.5 $mg/cm^2$ have been measured after immersion for 6 hours at 95° C. in a 0.02N aqueous solution of $Na_2CO_3$.

The above properties recommend the use of the inventive materials in such applications as lightweight consumer ware and as insulation in self-cleaning ovens, and, because of their low dielectric constant and good thermal expansion match with silicon, as substrates for electronic devices.

DESCRIPTION OF PREFERRED EMBODIMENTS

Table I reports a number of batched glass compositions, expressed in terms of parts by weight, demonstrating the compositional parameters of the inventive products. It will be appreciated that, except for the particular reducing agents, the recited batch ingredients are illustrative only; it is only necessary that the batch ingredients, upon melting together, will be converted into the desired oxides in the proper proportions.

Table IA records the compositions of Table I, as expressed in terms of weight percent on the oxide basis, and Table IB lists the compositions of Table I, as expressed in terms of mole percent on the oxide basis, except again for the reducing agents.

The batches were compounded, the ingredients ball-milled together to assist in securing a homogeneous melt, and charged into silica crucibles. The crucibles were covered, introduced into a furnace operating at about 1550°–1600° C., and the batches melted for about two hours. Thereafter, the melts were cast into glass slabs and those slabs immediately transferred to an annealer operating at about 600°–650° C.

Whereas the work described above was limited to laboratory experimentation which yielded glass slabs typically measuring 6"×4"×0.25", it will be appreciated that the compositions recited in Tables I, IA, and IB can be melted and shaped into glass articles of relatively large dimensions. For example, it has been possible to form slabs of glass exhibiting excellent homogeneity and surface quality having dimensions at least as large as 9"×9"×0.75" from the inventive compositions. Such capability contrasts with nominally equivalent glasses prepared from previously described formulations wherein ammonium acid phosphate ($NH_4H_2PO_4$) is introduced as the source of $P_2O_5$ and as the sole reducing agent. Except where extremely rigorous melting conditions are employed, large articles of those glasses will be inhomogeneous and may present a blistered surface. Moreover, the cell sizes in the fired gas-ceramic bodies frequently lacked uniformity. However, by introducing $P_2O_5$ in the batch materials as either $BPO_4$ or $P_2O_5$, and utilizing one or more of the reducing agents selected from the group of BN, Si, SiC, and $Si_3N_4$, it is possible to form large articles of high quality glass, which, when heat treated in accordance with the above-described procedures, will exhibit gas-containing cells of relatively uniform size.

TABLE I

|  | 1 | 2 | 3 | 4 | 5 | 6 |
|---|---|---|---|---|---|---|
| BPO$_4$ | 494 | 638 | 478 | 590 | 614 | 590 |
| SiO$_2$ | 168 | 248 | 190 | 263 | 263 | 282 |
| Si$_3$N$_4$ | 87 | — | — | — | — | — |
| Si | — | 53 | 38 | 57 | 57 | 60 |
| La$_2$O$_3$ | — | 20 | — | — | — | — |
| Al$_2$O$_3$ | — | — | — | — | 6 | — |

|  | 7 | 8 | 9 | 10 | 11 |
|---|---|---|---|---|---|
| BPO$_4$ | 614 | 402 | 590 | 402 | 402 |
| SiO$_2$ | 263 | 236 | 282 | 220 | 220 |
| SiC | — | 52 | — | — | — |
| Si | 57 | — | 60 | 44 | 44 |
| Al$_2$O$_3$ | — | — | — | 8 | — |
| La$_2$O$_3$ | 19 | — | 18 | — | 15 |
| Li$_2$O | — | — | — | 4 | — |
| B$_2$O$_3$ | — | 33 | — | 33 | 33 |

|  | 12 | 13 | 14 | 15 |
|---|---|---|---|---|
| BPO$_4$ | 590 | 421 | 239 | 316 |
| SiO$_2$ | 282 | 197 | 272 | 329 |
| SiC | — | — | — | — |
| Si$_3$N$_4$ | — | 102 | — | — |
| Si | 60 | — | — | — |
| Al$_2$O$_3$ | 6 | — | — | — |
| B$_2$O$_3$ | — | 29 | — | — |
| BN | — | — | 56 | 74 |
| P$_2$O$_5$ | — | — | 161 | — |

TABLE IA

|  | 1 | 2 | 3 | 4 | 5 | 6 |
|---|---|---|---|---|---|---|
| B$_2$O$_3$ | 21.7 | 21.9 | 22.3 | 21.3 | 21.5 | 20.8 |
| P$_2$O$_5$ | 44.3 | 44.6 | 45.4 | 43.5 | 43.8 | 42.5 |
| SiO$_2$ | 22.4 | 25.9 | 26.9 | 28.9 | 28.0 | 30.3 |
| Si$_3$N$_4$ | 11.6 | — | — | — | — | 6.4 |
| Si | — | 5.5 | 5.4 | 6.3 | 6.1 | — |
| La$_2$O$_3$ | — | 2.1 | — | — | — | — |
| Al$_2$O$_3$ | — | — | — | — | 0.6 | — |

|  | 7 | 8 | 9 | 10 | 11 |
|---|---|---|---|---|---|
| B$_2$O$_3$ | 21.9 | 22.9 | 20.4 | 23.2 | 23.1 |
| P$_2$O$_5$ | 42.5 | 37.3 | 41.7 | 38.0 | 37.8 |
| SiO$_2$ | 27.6 | 32.6 | 29.7 | 30.9 | 30.8 |
| Si | 6.0 | — | 6.3 | 6.2 | 6.2 |
| SiC | — | 7.2 | — | — | — |
| Al$_2$O$_3$ | — | — | — | 1.1 | — |
| La$_2$O$_3$ | 2.0 | — | 1.9 | — | 2.1 |
| Li$_2$O | — | — | — | 0.6 | — |

|  | 12 | 13 | 14 | 15 |
|---|---|---|---|---|
| B$_2$O$_3$ | 20.7 | 22.4 | 10.8 | 14.5 |
| P$_2$O$_5$ | 42.2 | 37.7 | 44.1 | 29.5 |
| SiO$_2$ | 30.1 | 26.3 | 37.4 | 45.8 |
| Si | 6.4 | — | — | — |
| Al$_2$O$_3$ | 0.6 | — | — | — |
| Si$_3$N$_4$ | — | 13.6 | — | — |
| BN | — | — | 7.7 | 10.3 |

TABLE IB

|  | 1 | 2 | 3 | 4 | 5 | 6 |
|---|---|---|---|---|---|---|
| B$_2$O$_3$ | 28.9 | 24.9 | 24.95 | 23.2 | 28.6 | 22.45 |
| P$_2$O$_5$ | 28.9 | 24.9 | 24.95 | 23.2 | 28.6 | 22.45 |
| SiO$_2$ | 34.5 | 34.1 | 35.0 | 36.5 | 35.6 | 37.9 |
| Si$_3$N$_4$ | 7.7 | — | — | — | — | — |
| Si | — | 15.6 | 15.1 | 17.1 | 16.7 | 17.2 |
| La$_2$O$_3$ | — | 0.5 | — | — | — | — |
| Al$_2$O$_3$ | — | — | — | — | 0.5 | — |

|  | 7 | 8 | 9 | 10 | 11 |
|---|---|---|---|---|---|
| B$_2$O$_3$ | 28.6 | 25.0 | 22.35 | 24.35 | 24.75 |
| P$_2$O$_5$ | 28.6 | 20.0 | 22.35 | 19.55 | 19.85 |
| SiO$_2$ | 35.7 | 41.3 | 37.7 | 37.6 | 38.4 |
| Si | 16.6 | — | 17.2 | 16.2 | 16.5 |
| SiC | — | 13.7 | — | — | — |
| Al$_2$O$_3$ | — | — | — | 0.8 | — |
| La$_2$O$_3$ | 0.5 | — | 0.4 | — | 0.5 |
| Li$_2$O | — | — | — | 1.5 | — |

|  | 12 | 13 | 14 | 15 |
|---|---|---|---|---|
| B$_2$O$_3$ | 22.35 | 28.65 | 11.1 | 13.1 |
| P$_2$O$_5$ | 22.35 | 23.65 | 22.2 | 13.0 |
| SiO$_2$ | 37.7 | 39.1 | 44.5 | 47.8 |
| Si | 17.2 | — | — | — |
| Si$_3$N$_4$ | — | 8.6 | — | — |
| Al$_2$O$_3$ | 0.4 | — | — | — |
| BN | — | — | 22.2 | 26.1 |

Specimens of the proper geometry for use in measuring various chemical and physical properties were cut from the glas slabs and those specimens, along with the remainder of the slabs, were introduced into an electrically-heated furnace. The temperature within the furnace was rasied at about 5° C./minute to about 700° C.; the temperature thereafter raised at about 50° C./hour to 800° C.; the temperature thereafter raised at about 5° C./minute to about 1000° C.; the temperature maintained thereat for about two hours; and the electric current to the furnace then cut off and foamed bodies allowed to cool to room temperature at "furnace rate" (averaging about 2°–5° C./minute).

Table II reports measurements of density (Dens.) in terms of g/cm$^3$, linear coefficient of thermal expansion (Exp.) over the range of R.T. to 300° C. in terms of $\times 10^{-7}$/°C., dielectric constant (D.C.) at R.T. and 100 KHz, dissipation factor (D.F.) at R.T. and 100 KHz, electric resistivity (Log$\rho$) at 350° C., weight loss in HCl (mg/cm$^2$), weight loss in deionized H$_2$O (mg/cm$^2$), and weight loss in Na$_2$CO$_3$ (mg/cm$^2$) as determined in accordance with techniques conventional in the glass and ceramic art.

TABLE II

|  | 1 | 2 | 3 | 4 | 5 | 6 |
|---|---|---|---|---|---|---|
| Dens. | 1.191 | 1.01 | 1.43 | 0.99 | 1.02 | 1.03 |
| Exp. | 44.6 | — | 47.7 | 47.2 | — | 43.8 |
| D.C. | 3.48 | — | 4.25 | 3.71 | 2.77 | 2.90 |
| D.F. | 0.006 | — | <0.001 | <0.001 | <0.001 | <0.001 |
| Log | 12.2 | — | 13.2 | 12.8 | 13.1 | 13.2 |

|  | 7 | 8 | 9 | 10 | 11 |
|---|---|---|---|---|---|
| Dens. | 1.11 | 1.68 | 1.13 | 1.06 | 1.09 |
| Exp. | 46.1 | — | 47.6 | — | 41.8 |
| D.C. | 3.05 | — | — | — | 2.53 |
| D.F. | <0.001 | — | <0.001 | — | <0.001 |
| Log | 12.6 | — | 12.9 | — | 13.0 |
| HCl | 0.10 | 3.4 | 0.08 | 0.93 | 6.61 |
| H$_2$O | 0.01 | 0.15 | 0.06 | 0.01 | 16.0 |
| Na$_2$CO$_3$ | 1.26 | 0.46 | 0.64 | 0.69 | 0.77 |

|  | 12 | 13 | 14 | 15 |
|---|---|---|---|---|
| Dens. | 1.01 | 1.35 | 1.04 | 1.21 |
| Exp. | 48.6 | — | — | — |
| D.C. | 2.94 | 2.58 | 2.89 | 3.31 |
| D.F. | <0.001 | <0.001 | <0.001 | <0.001 |
| Log | 13.1 | 13.2 | 13.0 | 13.2 |

I claim:

1. A method for preparing a gas-ceramic body having a SiO$_2$-rich glassy surface layer and consisting essentially of very fine-grained crystals of cubic BPO$_4$ and very small, unconnected gas-containing cells uniformly dispersed within a SiO$_2$-rich glassy matrix, wherein said gas consists predominantly of hydrogen, comprising the steps of:

(a) melting a batch for a glass consisting essentially, expressed in terms of weight percent on the oxide basis, of 30–60% $SiO_2$, 10–40% $B_2O_3$, 15–45% $P_2O_5$, and up to 20% total of at least one material in the indicated proportion selected from the group consisting of 5–15% BN, 5–10% Si, 5–10% SiC, and 10–20% $Si_3N_4$;

(b) cooling said melt to at least within the transformation range thereof and simultaneously shaping a glass body of a desired configuration therefrom; and thereafter (c) exposing said glass body to a temperature between about 900°–1050° C. for a period of time sufficient to cause the development of cubic $BPO_4$ crystals and gas-containing cells therein.

2. A method in accordance with claim 1 wherein Step (c) consists of first exposing said glass body to a temperature between about 700°–900° C. for a period of time sufficient to achieve nucleation of crystals therein and then exposing said nucleated glass body to a temperature between about 900°–1050° C. for a period of time sufficient to cause the development of cubic $BPO_4$ crystals and gas-containing cells therein.

3. A method in accordance with claim 2 wherein said time to achieve nucleation ranges about 1–3 hours and said time to develop crystals and gas-containing cells ranges about 1–4 hours.

* * * * *